United States Patent
Zhong et al.

(10) Patent No.: US 12,242,959 B2
(45) Date of Patent: Mar. 4, 2025

(54) METHOD, APPARATUS, DEVICE AND STORAGE MEDIUM FOR EMBEDDING USER APP INTEREST

(71) Applicant: Beijing Baidu Netcom Science and Technology Co., Ltd., Beijing (CN)

(72) Inventors: Huiqiang Zhong, Beijing (CN); Siqi Xu, Beijing (CN); Chenhui Liu, Beijing (CN); Lianghui Chen, Beijing (CN); Jun Fang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1024 days.

(21) Appl. No.: 17/202,721

(22) Filed: Mar. 16, 2021

(65) Prior Publication Data
US 2021/0201149 A1 Jul. 1, 2021

(30) Foreign Application Priority Data
Sep. 21, 2020 (CN) .......................... 202010995356.9

(51) Int. Cl.
*G06N 3/08* (2023.01)
*G06F 8/61* (2018.01)
(Continued)

(52) U.S. Cl.
CPC .............. *G06N 3/08* (2013.01); *G06F 8/61* (2013.01); *G06F 16/2282* (2019.01); *G06F 16/2477* (2019.01); *G06N 3/04* (2013.01)

(58) Field of Classification Search
CPC ............ G06N 3/08; G06N 3/04; G06N 3/044; G06N 3/045; G06N 3/084; G06F 16/2282; G06F 16/2477; G06F 8/61; G06F 16/9535
(Continued)

(56) References Cited

U.S. PATENT DOCUMENTS 10,873,782 B2 * 12/2020 Lomada ............. H04N 21/4532
11,122,333 B2 * 9/2021 Li ..................... H04N 21/44222
(Continued)

FOREIGN PATENT DOCUMENTS

| CA | 2997797 A1 | 3/2019 |
| CN | 107729560 A | 2/2018 |

(Continued)

OTHER PUBLICATIONS

Remo Manuel Frey, Runhua Xu, Christian Ammendola, Omar Moling, Giuseppe Giglio, Alexander Ilic, Mobile recommendations based on interest prediction from consumer's installed apps-insights from a large-scale field study, Information Systems, vol. 71, 2017, pp. 152-163. (Year: 2017).*

(Continued)

*Primary Examiner* — Chau T Nguyen
(74) *Attorney, Agent, or Firm* — Ice Miller LLP; Justin Swindells

(57) ABSTRACT

A method, an apparatus, a device and a storage medium for embedding user app interest are provided. The method includes: acquiring a user existing app installation list and a user app installation list within a predetermined time window, where the app includes app ID information and app category information; inputting the existing app installation list and the app installation list within the predetermined time window into a pre-trained user app interest embedding model to obtain a user app interest embedding vector. By combining the user existing app installation list information and the user recent app installation list information, the user app interest embedding vector may simultaneously reflect the user long-term interest and the user short-term interest.

13 Claims, 5 Drawing Sheets

(51) Int. Cl.
  *G06F 16/22* (2019.01)
  *G06F 16/2458* (2019.01)
  *G06N 3/04* (2023.01)
(58) Field of Classification Search
  USPC .......................................................... 706/12
  See application file for complete search history.

(56) References Cited

U.S. PATENT DOCUMENTS

| | | | |
|---|---|---|---|
| 11,681,756 B2* | 6/2023 | Lee ....................... | G06F 16/335 707/722 |
| 2010/0332326 A1 | 12/2010 | Ishai | |
| 2013/0117329 A1 | 5/2013 | Bank et al. | |
| 2019/0080225 A1 | 3/2019 | Agarwal et al. | |
| 2020/0107072 A1* | 4/2020 | Lomada ................. | G06N 3/084 |
| 2020/0132491 A1 | 4/2020 | Zhang et al. | |
| 2020/0374589 A1* | 11/2020 | Li ....................... | H04N 21/4826 |
| 2021/0034677 A1* | 2/2021 | Lee ..................... | G06F 16/3334 |

FOREIGN PATENT DOCUMENTS

| | | |
|---|---|---|
| CN | 108062342 A | 5/2018 |
| CN | 110765352 A | 2/2020 |
| CN | 111242748 A | 6/2020 |
| CN | 111523007 A | 8/2020 |
| KR | 20200007900 A | 1/2020 |

OTHER PUBLICATIONS

Cheng, V.C., Chen, L., Cheung, W.K et al. A heterogeneous hidden Markov model for mobile app recommendation. Knowl Inf Syst 57, 207-228 (2018). (Year: 2018).*
Huoran Li, Xuan Lu, Xuanzhe Liu, Tao Xie, Kaigui Bian, Felix Xiaozhu Lin, Qiaozhu Mei, and Feng Feng. 2015. Characterizing Smartphone Usage Patterns from Millions of Android Users. In Proceedings of the 2015 Internet Measurement Conference (IMC '15 ). ACM, 459-472. (Year: 2015).*
Zhao, Sha, Gang Pan, Yifan Zhao, Jianrong Tao, Jinlai Chen, Shijian Li, and Zhaohui Wu. "Mining user attributes using large-scale app lists of smartphones." IEEE Systems Journal 11, No. 1: 315-323. (Year: 2016).*
Li, Tong, Tong Xia, Huandong Wang, Zhen Tu, Sasu Tarkoma, Zhu Han, and Pan Hui. "Smartphone app usage analysis: datasets, methods, and applications." IEEE Communications Surveys & Tutorials 24, No. 2 (2022): 937-966. (Year: 2022).*
Li, D., & Song, D.H. (2017). Detecting Low Rating Android Apps Before They Have Reached the Market. ArXiv, abs/1712.05843. ( Year: 2017).*
M. Rungta, P. P. Sherki, M. P. Dhaliwal, H. Tiwari and V. Vala, "Two-Phase Multimodal Neural Network for App Categorization using APK Resources," 2020 IEEE 14th International Conference on Semantic Computing (ICSC), San Diego, CA, USA, 2020, pp. 162-165, (Year: 2020).*
K. Katsarou, G. Yu and F. Beierle, "WhatsNextApp: LSTM-Based Next-App Prediction With App Usage Sequences," in IEEE Access, vol. 10, pp. 18233-18247, 2022, (Year: 2022).*
Q. Ma, S. Muthukrishnan and W. Simpson, "App2Vec: Vector modeling of mobile apps and applications," 2016 IEEE/ACM International Conference on Advances in Social Networks Analysis and Mining (ASONAM), San Francisco, CA, USA, 2016, pp. 599-606, (Year: 2016).*
Q. Ma, "Modeling Users for Online Advertising," Thesis, Rutgers, State Univ. New Jersey, Oct. 2016, 115 total pages. (Year: 2016).*
Lee, Jinwoo, Yena Lee, Ming Jin, John Kim, and Jiman Hong. "Analysis of application installation logs on android systems." In Proceedings of the 34th ACM/SIGAPP Symposium on Applied Computing, pp. 2140-2145. 2019. (Year: 2019).*
Zhao, S., Xu, F., Xu, Y et al. Investigating smartphone user differences in their application usage behaviors: an empirical study. CCF Trans. Pervasive Comp. Interact. 1, 140-161 (2019). (Year: 2019).*
S. Zhao et al., "AppUsage2Vec: Modeling Smartphone App Usage for Prediction," 2019 IEEE 35th International Conference on Data Engineering (ICDE), Macao, China, 2019, pp. 1322-1333 (Year: 2019).*
Zhang, Junqi, Bing Bai, Ye Lin, Jian Liang, Kun Bai and Fei Wang. "General-Purpose User Embeddings based on Mobile App Usage." Proceedings of the 26th ACM SIGKDD International Conference on Knowledge Discovery & Data Mining (2020): n. pag. (Year: 2020).*
E. H.-C. Lu, Y.-W. Lin and J.-B. Ciou, "Mining mobile application sequential patterns for usage prediction," 2014 IEEE International Conference on Granular Computing (GrC), Noboribetsu, Japan, 2014, pp. 185-190 (Year: 2014).*
Zhung-Xun Liao, Yi-Chin Pan, Wen-Chih Peng, and Po-Ruey Lei. 2013. On mining mobile apps usage behavior for predicting apps usage in smartphones. In Proceedings of the 22nd ACM international conference on Information & Knowledge Management (CIKM '13), 609-618 (Year: 2013).*
C. Chen, T. Maekawa, A. Daichi and T. Hara, "Preliminary Investigation of Predicting Next-Use Mobile Apps Using App Semantic Representations," 2019 IEEE International Conference on Pervasive Computing and Communications Workshops (PerCom Workshops), Kyoto, Japan, 2019, pp. 391-394 (Year: 2019).*
Hua-Dong Yue, "Determining The Recommended Application APP Method and Device", published on Dec. 2, 2015, Document ID: CN-105117440A, pp. 12 (Year: 2015).*
An-teng Pan, "Using The Recommendation Method, Device, Storage Medium and Computer Equipment", published on Nov. 6, 2018, Document ID: CN 108769125 A, pp. 15 (Year: 2018).*
Jia et al., "Method, Device, Device and Storage Medium for Training Tag Generation Model", published on Aug. 20, 2024, but filed on Aug. 31, 2020, Document ID: CN 112036486 B, pp. 25 (Year: 2024).*
Xu et al., "A context-based using a sequence of APP recommending method and system", published on Mar. 23, 2018, Document ID: CN-107832426-A, pp. 13 (Year: 2018).*
Zhou et al., "APP starting accelerating method based on heterogeneous network with attribute embedded", published on Jul. 7, 2020, Document Id: CN-111381902-A, p. 45 (Year: 2020).*
European Patent Office, Extended European Search Report for Application No. 21162110.7, dated Sep. 7, 2021 (26 pages).
Baltrunas, L et al.; "Frappe: Understanding the Usage and Perception of Mobile App Recommendations In-the-Wild"; ARXIV.org, Cornell University Library, 201 Olin Library, Cornell University, Ithaca, New York 14853; May 12, 2015; XP080792671 (10 pages).

* cited by examiner

METHOD, APPARATUS, DEVICE AND STORAGE MEDIUM FOR EMBEDDING USER APP INTEREST

CROSS-REFERENCE TO RELATED APPLICATIONS

This application claims the priority of Chinese Patent Application No. 202010995356.9, titled "METHOD, APPARATUS, DEVICE AND STORAGE MEDIUM FOR EMBEDDING USER APP INTEREST", filed on Sep. 21, 2020, the content of which is incorporated herein by reference in its entirety.

TECHNICAL FIELD

The present disclosure relates to the field of computer technology, in particular, to the technical field of large data, and more in particular, to a method, apparatus, device and storage medium for embedding user app interest.

BACKGROUND

The application (app) is closely related to personalized information of a user. The user may download from the app market, install, use and uninstall apps according to their needs. The user app installation behavior may reflect the personal information, interest preferences, personality and lifestyle of the user, etc. to a large extent.

At present, the one-hot features and the app category statistical features are used as user app installation features. Due to the large number of apps, the use of the one-hot features may lead to a very large feature space. Furthermore, the one-hot features can not express the relationship between different apps, which may affect the use of the downstream tasks.

SUMMARY

In order to solve one or more technical problems mentioned in the background, the embodiments of the present disclosure provide a method, apparatus, device and storage medium for embedding user app interest.

In a first aspect, an embodiment of the present disclosure provides a method for embedding user app interest, the method including: acquiring a user existing app installation list and a user app installation list within a predetermined time window, where the app includes app ID information and app category information; inputting the existing app installation list and the app installation list within the predetermined time window into a pre-trained user app interest embedding model to obtain a user app interest embedding vector.

In a second aspect, an embodiment of the present disclosure provides an apparatus for embedding user app interest, the apparatus including: an acquisition module, configured to acquire a user existing app installation list and a user app installation list within a predetermined time window, where the app includes app ID information and app category information; an output module, configured to input the existing app installation list and the app installation list within the predetermined time window into a pre-trained user app interest embedding model to obtain a user app interest embedding vector.

In a third aspect, an embodiment of the present disclosure provides an electronic device, including: at least one processor; and a memory communicating with the at least one processor, where the memory stores instructions executable by the at least one processor, and the instructions, when executed by the at least one processor, cause the at least one processor to execute the method as described in any one of the implementations of the first aspect.

In a fourth aspect, an embodiment of the present disclosure provides a non-transitory computer readable storage medium storing computer instructions, where the computer instructions cause a computer to execute the method as described in any one of the implementations of the first aspect.

According to the method, apparatus, device and storage medium for embedding the user app interest provided by the embodiments of the present disclosure, the user existing app installation list and the user app installation list within the predetermined time window are first acquired; and then the existing app installation list and the app installation list within the predetermined time window are input into the pre-trained user app interest embedding model to obtain the user app interest embedding vector.

It should be appreciated that the content described in this part is not intended to identify the key or critical features of the embodiments of the present disclosure, nor is it intended to limit the scope of the present disclosure. The other features of the present disclosure will become easy to understand through the following description.

BRIEF DESCRIPTION OF THE DRAWINGS

After reading the detailed descriptions of non-limiting embodiments with reference to the following accompanying drawings, other features, objectives and advantages of the present disclosure will be more apparent. The accompanying drawings are intended to provide a better understanding of the present disclosure and do not constitute a limitation to the present disclosure.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the present disclosure, rather than limiting the present disclosure. In addition, it should be noted that, for the ease of description, only the parts related to the present disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
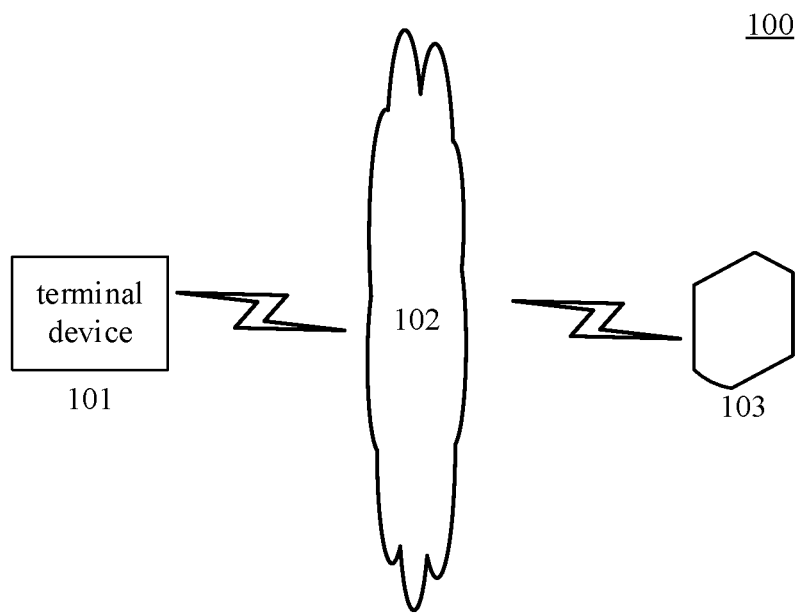
FIG. 1 is an example system architecture diagram in which the present disclosure may be applied.

FIG. 1 shows an example system architecture 100 in which a method for embedding user app interest or an apparatus for embedding the user app interest of the present disclosure may be applied.

As shown in FIG. 1, the system architecture 100 may include a terminal device 101, a network 102 and a server 103. The network 102 serves as a medium providing a communication link between the terminal devices 101 and the server 103. The network 102 may include various types of connections, such as, wired or wireless communication links, or optical fiber cables.

The terminal device 101 may interact with the server 103 through the network 102. The terminal device may provide a user app installation log, and the terminal device includes but is not limited to a database or a user terminal.

The server 103 may provide various services. For example, the server 103 may analyze data, such as a user app installation log acquired from the terminal device 101 and generate a processing result (for example, a user app interest embedding vector).

It should be noted that the server 103 may be hardware or software. When the server 103 is hardware, the hardware may be implemented as a distributed server cluster composed of multiple servers, or as a single server; and when the server 103 is software, the software may be implemented as multiple software pieces or software modules, or as a single software piece or software module, which are not specifically limited herein.

It should be noted that the method for embedding the user app interest provided by the embodiment of the present disclosure is generally executed by the server 103. Correspondingly, the apparatus for embedding the user app interest is generally arranged in the server 103.

It should be appreciated that the number of the terminal device, the network, and the server in FIG. 1 is merely illustrative. Any number of terminal devices, networks, and servers may be provided based on actual requirements.

Figure 2:
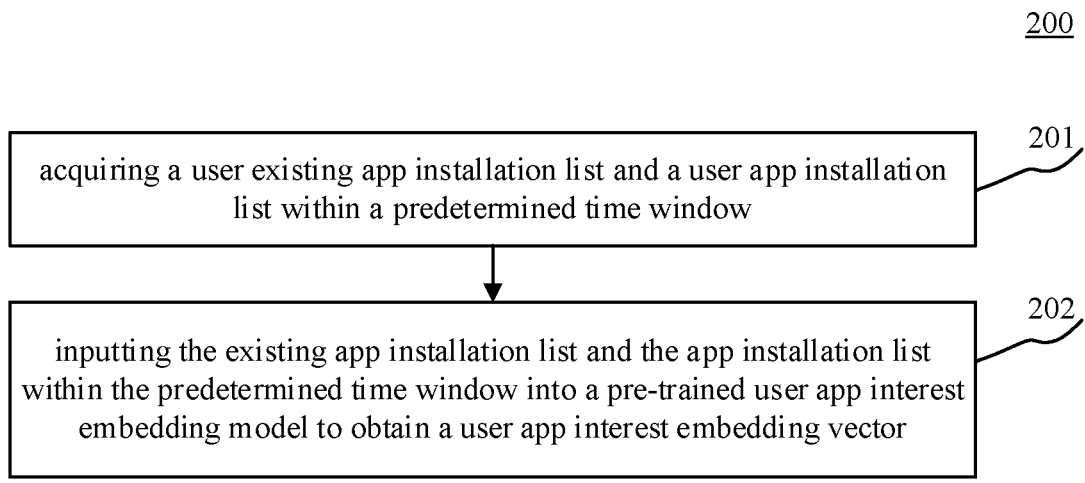
FIG. 2 is a flow diagram of an embodiment of a method for embedding user app interest according to the present disclosure.

Further referring to FIG. 2, FIG. 2 shows a flow 200 of an embodiment of a method for embedding user app interest according to the present disclosure, and the flow 200 includes the steps 201 to 202.

Step 201 includes acquiring a user existing app installation list and a user app installation list within a predetermined time window.

In this embodiment, the execution body of the method for embedding the user app interest may acquire a user existing app installation list and a user app installation list within a predetermined time window. The user existing app installation list refers to the user existing app installation list at the current time point; and the user app installation list within the predetermined time window refers to the app installation list within the time window before the current time point. For example, if the predetermined time window may be set to 2 weeks or 1 month, the user app installation list in the past 2 weeks or 1 month may be acquired. In this embodiment, the app information of the app installation list includes the app ID information and the app category information. Specifically, multiple app names of a given app in different systems may be mapped to one piece of app ID information. The app category includes a social category, a news category, a shopping category, an entertainment category, a financial category, a life category and a tool category, etc.

Step 202 includes inputting the existing app installation list and the app installation list within the predetermined time window into a pre-trained user app interest embedding model to obtain a user app interest embedding vector.

In this embodiment, the execution body may input the existing app installation list and the app installation list within the predetermined time window into a pre-trained user app interest embedding model to obtain a user app interest embedding vector. The user app interest embedding model herein is obtained by training an untrained user app interest embedding model. Each layer of the untrained user app interest embedding model may be set with initial parameters that may be continually adjusted during the training. The untrained user app interest embedding model may be any type of untrained or partially trained artificial neural networks, or a model obtained by combining multiple untrained or partially trained artificial neural networks, for example, the untrained user app interest embedding model may be an untrained convolutional neural network, an untrained recurrent neural network or a model obtained by combining an untrained convolutional neural network, an untrained recurrent neural network and an untrained fully connected layer.

In some alternative implementations of this embodiment, the untrained user app interest embedding model may be an untrained autoencoder network model. Each layer of the untrained autoencoder network model may be set with initial parameters. The parameters may be adjusted continuously during the training until a well trained autoencoder network model is obtained. By using the autoencoder network model, embedding the unsupervised user app installation feature may be implemented without relying on the label data of the user app installation behavior.

Compared with the existing technology, the embodiment of the present disclosure combines the user existing app installation list information and the user recent app installation list information, so that the user app interest embedding vector can simultaneously reflect the user long-term interest and the user short-term interest. By combining the app ID information and the app category information, the sparse problem of the long-tail app may be alleviated, thereby improving the representation capability of the user app interest embedding vector.

Figure 3:
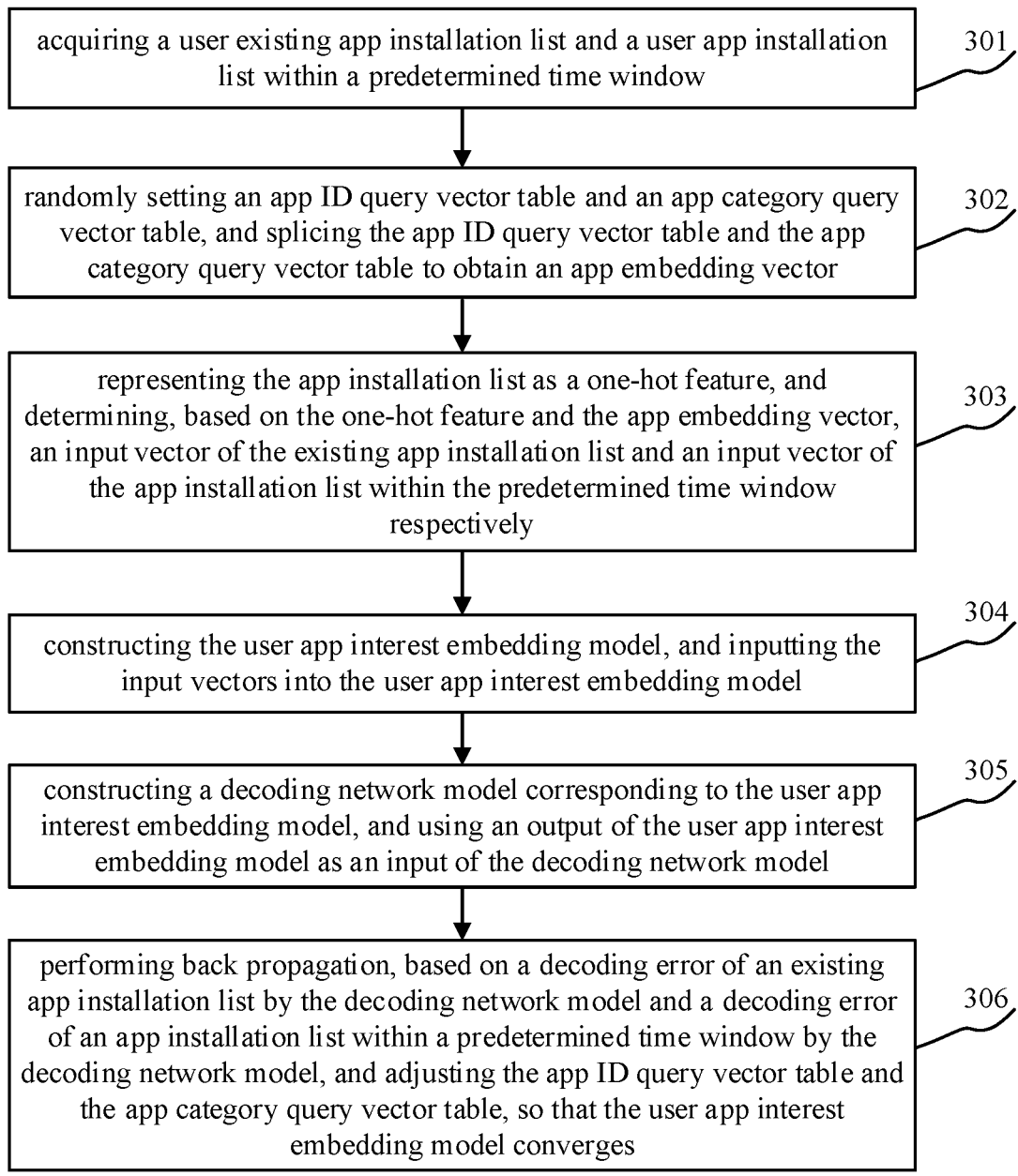
FIG. 3 is a flow diagram of a training process of a user app interest embedding model according to an embodiment of the present disclosure.

Further referring to FIG. 3, FIG. 3 shows a flow diagram of a training process of a user app interest embedding model according to an embodiment of the present disclosure, and the flow includes the following steps 301 to 306.

Step 301 includes acquiring a user existing app installation list and a user app installation list within a predetermined time window.

In this embodiment, the execution body may acquire a user existing app installation list and a user app installation list within a predetermined time window. The app installation list within the predetermined time window refers to the app installation list within the time window before the current time point. For example, if the predetermined time window is set to 2 weeks or 1 month, the user app installation list in the past 2 weeks or 1 month may be acquired. In this embodiment, the app information of the app installation list includes the app ID information and the app category information. Specifically, multiple app names of a given app in different systems may be mapped to one piece of app ID information. The app category includes a social category, a news category, a shopping category, an entertainment category, a financial category, a life category and a tool category, etc.

Step 302 includes randomly setting an app ID query vector table and an app category query vector table, and splicing the app ID query vector table and the app category query vector table to obtain an app embedding vector.

In this embodiment, the execution body may randomly set an app ID query vector table and an app category query vector table, and splice the app ID query vector table and the app category query vector table to obtain an app embedding vector. The input data of the user app interest embedding model includes an existing app installation list and a recent app installation list, and each app includes the app ID information and the category information. First, the app needs to be embedded, and the app ID query vector table and the app category query vector table are randomly set. The dimensions of the tables are respectively n1*v1 and n2*v2, where n1 is the number of apps, v1 is the dimension of the app ID vector, n2 is the number of app categories, and v2 is the dimension of the app category vector. The app embedding vector is generated by splicing the app ID vector and the app category vector, and the dimension is v1+v2. Then, the app embedding vector corresponding to the existing app installation list and the app embedding vector corresponding to the recent app installation list are generated respectively.

Step 303 includes representing the app installation list as a one-hot feature, and determining, based on the one-hot feature and the app embedding vector, an input vector of the existing app installation list and an input vector of the app installation list within the predetermined time window respectively.

In this embodiment, the execution body may represent the app installation list as a one-hot feature, and determine, based on the one-hot feature and the app embedding vector, an input vector of the existing app installation list and an input vector of the app installation list within the predetermined time window respectively. Specifically, the app installation list is first represented as the one-hot feature, the m-th dimension being 1 indicates that the app is installed, and 0 indicates that the app is not installed, where m is a positive integer. The one-hot feature of the app installation list is then multiplied with the app embedding vector to obtain the input vector of the existing app installation list and the input vector of the app installation list within the predetermined time window.

Step 304 includes constructing the user app interest embedding model, and inputting the input vectors into the user app interest embedding model.

In this embodiment, the autoencoder network model may be constructed, and the input vector of the existing app installation list and the input vector of the app installation list within the predetermined time window are input into the autoencoder network model, and the user app installation behavior is characterized by the autoencoder network model. Specifically, a pooling operation may be performed on the input vector of the existing app installation list and the input vector of the recent app installation list respectively, and the pooling operation includes three modes, e.g., summing, averaging, and maximizing. The pooling results are spliced to obtain output vectors of the dimension 2*3*(v1+v2), where 2 indicates two types of inputs: an existing app installation list and a recent app installation list, 3 indicates three types of pooling operations, summing, averaging and maximizing, and v1+v2 indicates an embedding vector of the app. Finally, the user app installation behavior is characterized by N hidden-layer neural network models, each of which may include full connection layers with activation functions, where the activation function of the first M layer is Relu, and the activation function of the last layer is sigmoID, which may be represented by a triplet (f, W, b), where f is the activation function, w is the full connection weight, and b is the full connection offset. If Xn represents the output of the neural network model, then Xn=fn (Xn−1*Wn+bn), Xn is the output vector of the autoencoder network model.

Step 305 includes constructing a decoding network model corresponding to the user app interest embedding model, and using an output of the user app interest embedding model as an input of the decoding network model.

In this embodiment, the execution body may construct a decoding network model corresponding to the user app interest embedding model, and use an output of the user app interest embedding model as an input of the decoding network model. Specifically, the decoding network model includes a Decoder1 module and a Decoder2 module. N hidden-layer neural network models, which are arranged in an inverse order of and are identical to the autoencoder network model, are first used, for example, the hidden-layer size of the autoencoder network model are [h1, h2, h3], where h1 is the input and h2 and h3 are the hidden-layer outputs; and the hidden-layer size of the Decoder1 module is then [h3, h2, h1], where h3 is the input and h2 and h1 are the hidden-layer outputs. Then, the Decoder2 module decodes the outputs of the Decoder1 module and obtains the one-hot feature of the existing app installation list and the one-hot feature of the recent app installation list respectively by using a model composed of N full connection layers with the sigmoID activation function. The input size of the full connection is the output h1 of Decoder1, and the output size of the full connection is the number n1 of apps.

Step 306 includes performing back propagation, based on a decoding error of an existing app installation list by the decoding network model and a decoding error of an app installation list within a predetermined time window by the decoding network model, and adjusting the app ID query vector table and the app category query vector table, so that the user app interest embedding model converges.

In this embodiment, the loss function adopts the MSE mean square error, and the model loss is composed of loss1 and loss2, where loss1 is the decoding error of the existing app installation list, and loss2 is the decoding error of the recent app installation list, and overall loss=loss1+a*loss2, where a is the harmonic weight. The back propagation is performed based on the loss, and the parameters, the app ID query vector table and the app category query vector table are updated until the user app interest embedding model converges or the maximum number of iterations is reached.

Figure 4:
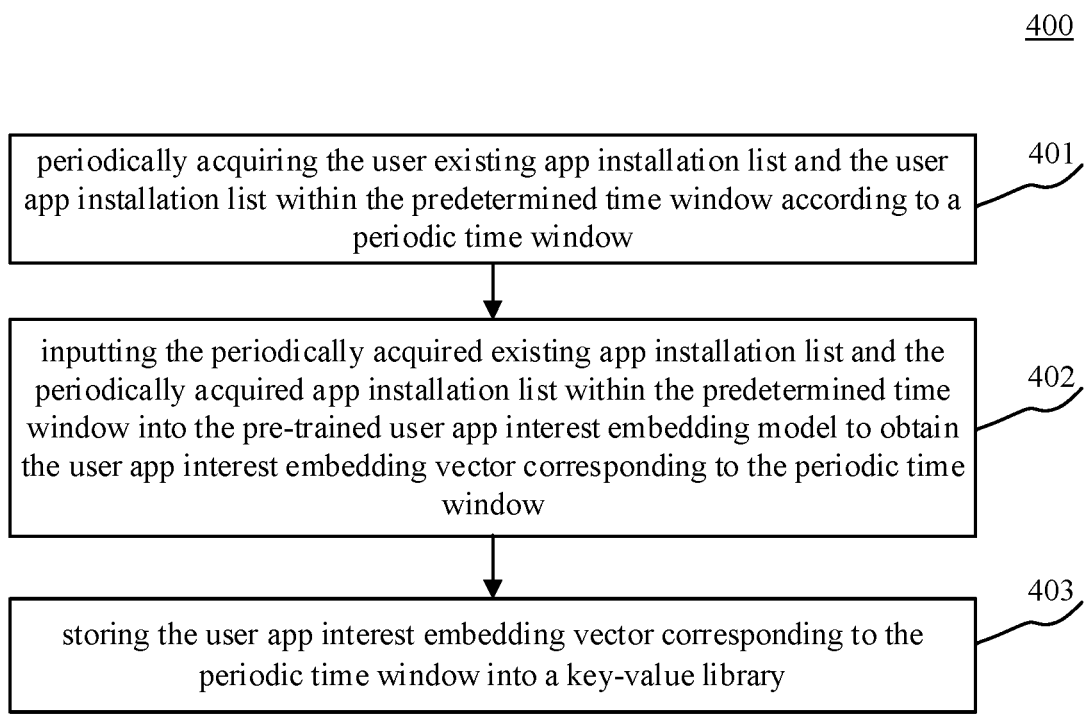
FIG. 4 is a flow diagram of another embodiment of the method for embedding the user app interest according to the present disclosure.

Further referring to FIG. 4, FIG. 4 shows a flow 400 of another embodiment of the method for embedding the user app interest according to the present disclosure, and the flow 400 includes the following steps 401 to 403.

Step 401 includes periodically acquiring the user existing app installation list and the user app installation list within the predetermined time window according to a periodic time window.

In this embodiment, the periodic time window may be set to a specific duration according to the user needs. For example, the periodic time window may be set to 2 weeks or 1 month, the user existing app installation list and the user app installation list within the predetermined time window may be acquired every 2 weeks or 1 month.

Step 402 includes inputting the periodically acquired existing app installation list and the periodically acquired app installation list within the predetermined time window into the pre-trained user app interest embedding model to obtain the user app interest embedding vector corresponding to the periodic time window.

In this embodiment, the execution body may input the periodically acquired existing app installation list and the periodically acquired app installation list within the predetermined time window into the pre-trained user app interest embedding model to obtain the user app interest embedding vector corresponding to the periodic time window. For example, the periodic time window may be set to 2 weeks or 1 month, and the user existing app installation list and the user app installation list within the predetermined time window may be input into the pre-trained user app interest embedding model every 2 weeks or 1 month to obtain the user app interest embedding vector every 2 weeks or 1 month.

Step 403 includes storing the user app interest embedding vector corresponding to the periodic time window into a key-value library.

In this embodiment, the execution body may store the periodically acquired user app interest embedding vector into a key-value library.

In this embodiment, by setting the periodic time window, the user app interest embedding vector is periodically acquired and stored in the key-value library, so that the problems that the prediction pressure of the user app interest embedding model is high, caused by the frequent update of the user app interest representation vector and the large request amount, may be solved.

Figure 5:
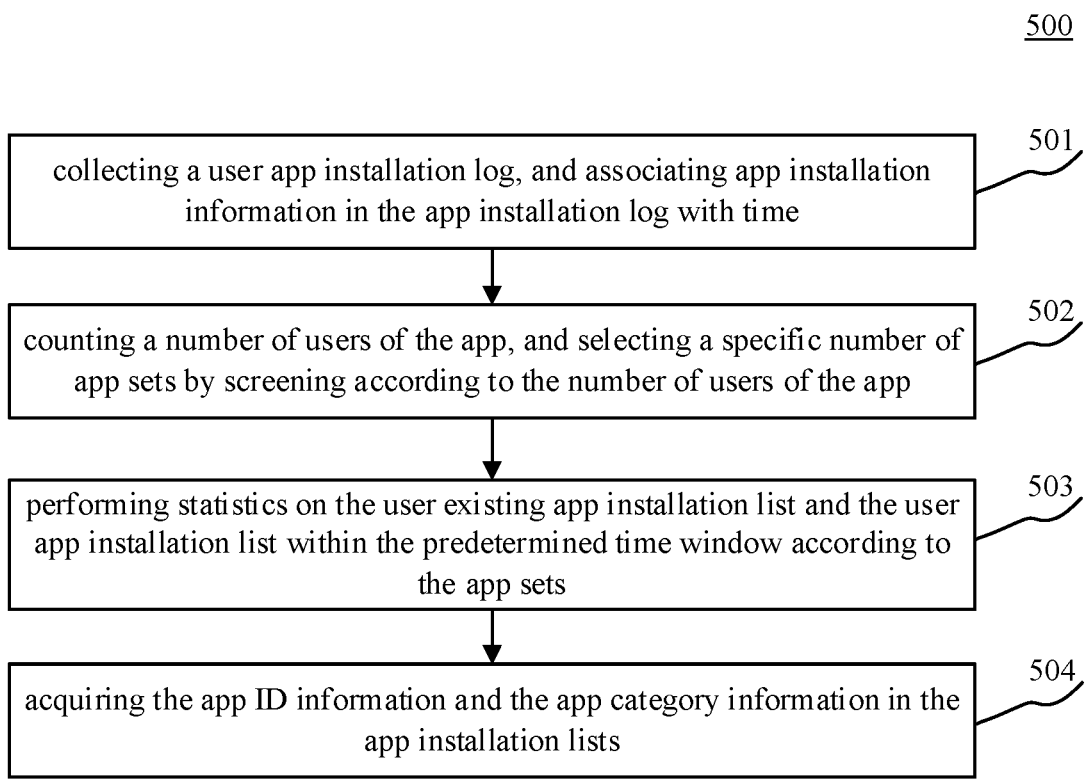
FIG. 5 is a flow diagram of an embodiment of acquiring a user existing app installation list and a user app installation list within a predetermined time window according to the present disclosure.

Further referring to FIG. 5, FIG. 5 shows a flow diagram of an embodiment of acquiring a user existing app installation list and a user app installation list within a predetermined time window according to the present disclosure.

As shown in FIG. 5, the acquiring a user existing app installation list and a user app installation list within a predetermined time window, includes the following steps 501 to 504.

Step 501 includes collecting a user app installation log, and associating app installation information in the app installation log with time.

In this embodiment, the execution body may collect a user app installation log, and may associate app installation information in the app installation log with time. The pieces of app installation information of a user at different time are used as different samples.

Step 502 includes counting a number of users of the app, and selecting a specific number of app sets by screening according to the number of users of the app.

In this embodiment, the execution body may count the number of users of the app, and selecting n app sets by screening based on the user coverage rate or the top k method, where k and n are both positive integers.

Step 503 includes performing statistics on the user existing app installation list and the user app installation list within the predetermined time window according to the app sets.

In this embodiment, the execution body may perform statistics on the user existing app installation list at a specific time and the user app installation list within the predetermined time window, for example, the predetermined time window may be set to 2 weeks or 1 month.

Step 504 includes acquiring the app ID information and the app category information in the app installation lists.

In this embodiment, the execution body may acquire or generate the fine-grained category information corresponding to the app, and each app includes the app ID information and the category information.

Figure 6:
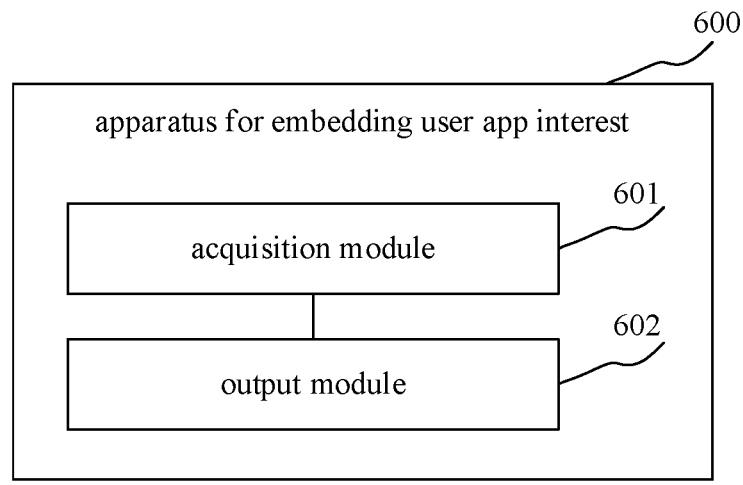
FIG. 6 is a structural diagram of an embodiment of an apparatus for embedding the user app interest according to the present disclosure.

Further referring to FIG. 6, as an implementation of the method shown in each of above figures, the present disclosure provides an embodiment of an apparatus for embedding the user app interest, which corresponds to the embodiment of the method shown in FIG. 2. The apparatus may specifically be applied in various electronic devices.

As shown in FIG. 6, the apparatus 600 for embedding the user app interest of this embodiment may include: an acquisition module 601 and an output module 602. The acquisition module 601 is configured to acquire a user existing app installation list and a user app installation list within a predetermined time window, where the app includes app ID information and app category information. The output module 602 is configured to input the existing app installation list and the app installation list within the predetermined time window into a pre-trained user app interest embedding model to obtain a user app interest embedding vector.

In this embodiment, the specific process of the acquisition module 601 and the output module 602 in the apparatus 600 for embedding the user app interest and the technical effects thereof may be described with reference to the related description of the steps 201-202 in the corresponding embodiment of FIG. 2, and details are not described herein again.

In some alternative implementations of this embodiment, the apparatus may further include a training module, and the training module includes: an acquisition module, configured to acquire a user existing app installation list and a user app installation list within a predetermined time window, where the app includes app ID information and app category information; an initialization module, configured to randomly set an app ID query vector table and an app category query vector table, and splice the app ID query vector table and the app category query vector table to obtain an app embedding vector; a vectorization module, configured to represent the app installation list as a one-hot feature, and determine, based on the one-hot feature and the app embedding vector, an input vector of the existing app installation list and an input vector of the app installation list within the predetermined time window respectively; an embedding model construction module, configured to construct the user app interest embedding model, and input the input vectors into the user app interest embedding model; a decoding model construction module, configured to construct a decoding network model corresponding to the user app interest embedding model, and use an output of the user app interest embedding model as an input of the decoding network model; and a parameter adjustment module, configured to perform back propagation, based on decoding error of the existing app installation list by the decoding network model and decoding error of the app installation list within the predetermined time window by the decoding network model, and adjust the app ID query vector table and the app category query vector table, so that the user app interest embedding model converges.

In some alternative implementations of this embodiment, the acquisition module further includes a periodic acquisition module, configured to periodically acquire the user existing app installation list and the user app installation list within the predetermined time window according to a periodic time window, where the app includes the app ID information and the app category information; the output module is further configured to input the periodically acquired existing app installation list and the periodically acquired app installation list within the predetermined time window into the pre-trained user app interest embedding model to obtain the user app interest embedding vector corresponding to the periodic time window; and the apparatus further includes a storage module, configured to store the user app interest embedding vector corresponding to the periodic time window into a key-value library.

In some alternative implementations of this embodiment, the acquisition module further includes: a collection module, configured to collect a user app installation log, and associate app installation information in the app installation log with time; a screening module, configured to count a number of users of the app, and selecting a specific number of app sets by screening according to the user number of the app; a statistics module, configured to perform statistics on the user existing app installation list and the user app installation list within the predetermined time window according to the app sets; and an acquiring module, configured to acquire the app ID information and the app category information in the app installation lists.

In some alternative implementations of this embodiment, the user app interest embedding model is a autoencoder network model.

Figure 7:
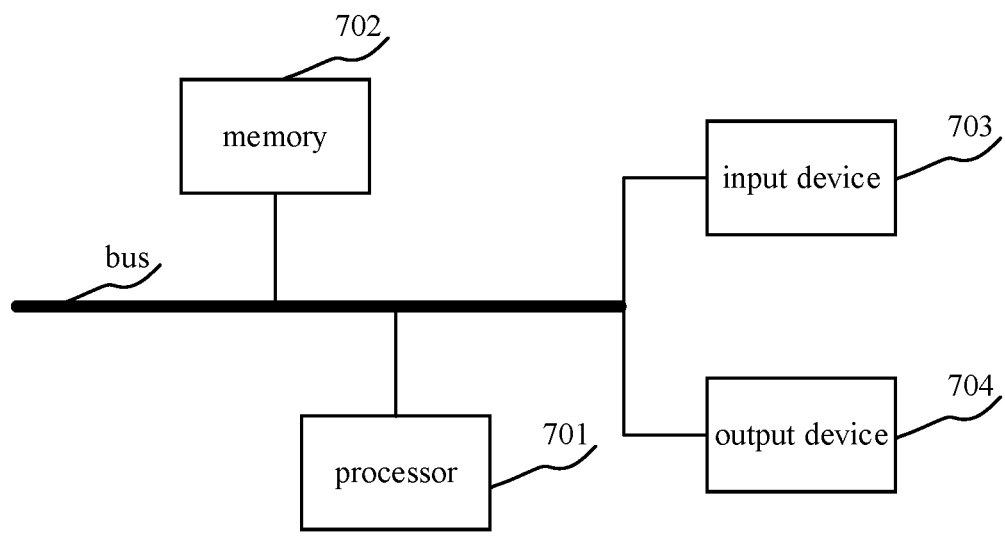
FIG. 7 is a block diagram of an electronic device adapted to implement the method for embedding the user app interest according to an embodiment of the present disclosure.

FIG. 7 shows a block diagram of an electronic device adapted to implement the method for embedding the user app interest according to an embodiment of the present disclosure. The electronic device is intended to represent various forms of digital computers, such as laptops, desktops, worktables, personal digital assistants, servers, blade servers, mainframe computers and other suitable computers. The electronic device may also represent various forms of mobile devices, such as personal digital processing, cellular phones, smart phones, wearable devices and other similar computing devices. The parts, their connections and relationships, and their functions shown herein are examples only, and are not intended to limit the implementations of the present disclosure as described and/or claimed herein.

As shown in FIG. 7, the electronic device includes one or more processors 701, a memory 702, and interfaces for connecting components, including a high-speed interface and a low-speed interface. The components are interconnected by using different buses and may be mounted on a common motherboard or otherwise as required. The processor may process instructions executed within the electronic device, including instructions stored in memory or on memory to display graphical information of the GUI on an external input or output device (such as a display device coupled to an interface). In other embodiments, multiple processors and/or multiple buses may be used with multiple memories, if required. Similarly, multiple electronic devices may be connected, each of which provides some of the necessary operations (for example, used as a server array, a set of blade servers, or a multiprocessor system). An example of a processor 701 is shown in FIG. 7.

The memory 702 is a non-transitory computer readable storage medium provided by the present disclosure. The memory stores instructions executable by at least one processor to cause the at least one processor to execute the method for embedding the user app interest provided by the present disclosure. The non-transitory computer readable storage medium of the present disclosure stores computer instructions for causing a computer to execute the method for embedding the user app interest provided by the present disclosure.

As a non-transitory computer readable storage medium, the memory 702 may be used to store non-transitory software programs, non-transitory computer executable programs and modules, such as the program instructions or modules corresponding to the method for embedding the user app interest in the embodiment of the present disclosure (such as the acquisition module 601 and the output module 602 shown in FIG. 6). The processor 701 runs the non-transitory software programs, instructions and modules stored in the memory 702 to execute various functional applications and data processing of the server, thereby implementing the method for embedding the user app interest in the above embodiments of the method.

The memory 702 may include a storage program area and a storage data area, where the storage program area may store an operating system and an application program required by at least one function; and the storage data area may store data created by the use of the electronic device according to the method for embedding the user app interest and the like. In addition, the memory 702 may include a high-speed random access memory, and may further include a non-transitory memory, such as at least one magnetic disk storage device, a flash memory or other non-transitory solid state storage devices. In some embodiments, the memory 702 may alternatively include a memory disposed remotely relative to the processor 701, which may be connected through a network to the electronic device of the method for embedding the user app interest. Examples of such networks include, but are not limited to, the Internet, enterprise intranets, local area networks, mobile communication networks and combinations thereof.

The electronic device adapted to execute the method for embedding the user app interest may further include an input device 703 and an output device 704. The processor 701, the memory 702, the input device 703 and the output device 704 may be interconnected through a bus or other means, and an example of a connection through a bus is shown in FIG. 7.

The input device 703 may receive an input number or character information, and generate key signal input related to user settings and functional control of the electronic device adapted to execute the method for embedding the user app interest, such as a touch screen, a keypad, a mouse, a track pad, a touch pad, a pointer bar, one or more mouse buttons, a trackball or a joystick. The output device 704 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory or programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein) or a computing system including any combination of such background component, middleware component or front-end component. The components of the system may be interconnected by any form or medium of digital data communication (such as a communication network). Examples of communication networks include a local area network (LAN), a wide area network (WAN) and the Internet.

The computer system may include a client and a server. The client and the server are generally remote from each other and interact generally through a communication network. The relationship between the client and the server is generated by running the computer programs having a client-server relationship with each other on the corresponding computer.

According to the solutions of the present disclosure, the user existing app installation list and the user app installation list within the predetermined time window are first acquired; and the existing app installation list and the app installation list within the predetermined time window are then input into the pre-trained user app interest embedding model to obtain the user app interest embedding vector. By combining the user existing app installation list information and the user recent app installation list information, the user app interest embedding vector may simultaneously reflect the user long-term interest and the user short-term interest. By combining the app ID information and the app category information, the sparse problem of the long-tail app may be alleviated, thereby improving the representation capability of the user app interest embedding vector.

It should be appreciated that the steps of reordering, adding or deleting may be executed using the various forms shown above. For example, the steps described in the present disclosure may be executed in parallel or sequentially or in a different order, so long as the desired results of the technical solutions provided by the present disclosure may be realized, and no limitation is imposed herein.

The above specific description is not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for embedding user app interest, the method comprising:

acquiring a user existing app installation list and a user app installation list within a predetermined time window, wherein an app comprises app ID information and app category information; and inputting the user existing app installation list and the user app installation list within the predetermined time window into a pre-trained user app interest embedding model to obtain a user app interest embedding vector, wherein the pre-trained user app interest embedding model is a neural network, and is trained by:

collecting a set of sample user app installation lists comprising a sample current user app installation list, and a sample previous user app installation list within a sample predetermined time window before a sample current time point, wherein the sample current user app installation list comprises first app ID information and first app category information, and the sample previous user app installation list comprises second app ID information and second app category information;

generating a first sample app embedding vector of the sample current user app installation list and generating a second sample app embedding vector of the sample previous user app installation list, by randomly setting an app ID query vector table and an app category query vector table and splicing the app ID query vector table and the app category query vector table; representing the sample current user app installation list as a first one-hot feature, representing the sample previous user app installation list as a second one-hot feature, determining a first input vector of the sample current app installation list by multiplying the first sample app embedding vector with the first one-hot feature, and determining a second input vector of the sample previous app installation list by multiplying the second sample app embedding vector with the second one-hot feature; and training the pre-trained user app interest embedding model using the first input vector and the second input vector as an input.

2. The method according to claim 1, wherein training the pre-trained user app interest embedding model using the first input vector and the second input vector comprises:

inputting the input vectors into the pre-trained user app interest embedding model;

constructing a decoding network model corresponding to the pre-trained user app interest embedding model, and using an output of the pre-trained user app interest embedding model as an input of the decoding network model; and performing back propagation, based on a decoding error of the sample current user app installation list by the decoding network model and a decoding error of the sample previous user app installation list by the decoding network model, and adjusting the app ID query vector table and the app category query vector table, so that the pre-trained user app interest embedding model converges.

3. The method according to claim 1, wherein,
the acquiring a user existing app installation list and a user app installation list within a predetermined time window, further comprises:
periodically acquiring the user existing app installation list and the user app installation list within the predetermined time window according to a periodic time window, wherein the app comprises the app ID information and the app category information;
the inputting the user existing app installation list and the user app installation list within the predetermined time window into the pre-trained user app interest embedding model to obtain a user app interest embedding vector, further comprises:
inputting the periodically acquired user existing app installation list and the user app installation list within the predetermined time window into the pre-trained user app interest embedding model to obtain the user app interest embedding vector corresponding to the periodic time window; and
the method further comprises:
storing the user app interest embedding vector corresponding to the periodic time window into a key-value library.

4. The method according to claim 1, wherein collecting the set of sample user app installation lists comprising the sample current user app installation list and the sample previous user app installation list comprises:
collecting a user app installation log, and associating app installation information in the app installation log with time;
counting a number of users of the training app, and selecting a specific number of app sets by screening according to the number of users of the training app;
determining the sample current user app installation list and the sample previous user app installation list according to the app sets; and
acquiring the first app ID information, the first app category information, second app ID information and second app category information from the sample current user app installation list and the sample previous user app installation list.

5. The method according to claim 1, wherein the pre-trained user app interest embedding model is an autoencoder network model.

6. An electronic device, comprising:
at least one processor; and
a memory communicating with the at least one processor, wherein the memory stores instructions executable by the at least one processor, and the instructions, when executed by the at least one processor, cause the at least one processor to perform operations comprising:
acquiring a user existing app installation list and a user app installation list within a predetermined time window, wherein an app comprises app ID information and app category information; and
inputting the user existing app installation list and the user app installation list within the predetermined time window into a pre-trained user app interest embedding model to obtain a user app interest embedding vector, wherein the pre-trained user app interest embedding model is a neural network, and is trained by:

collecting a set of sample user app installation lists comprising a sample current user app installation list, and a sample previous user app installation list within a sample predetermined time window before a sample current time point, wherein the sample current user app installation list comprises first app ID information and first app category information, and the sample previous user app installation list comprises second app ID information and second app category information;
generating a first sample app embedding vector of the sample current user app installation list and generating a second sample app embedding vector of the sample previous user app installation list, by randomly setting an app ID query vector table and an app category query vector table and splicing the app ID query vector table and the app category query vector table; representing the sample current user app installation list as a first one-hot feature, representing the sample previous user app installation list as a second one-hot feature, determining a first input vector of the sample current app installation list by multiplying the first sample app embedding vector with the first one-hot feature, and determining a second input vector of the sample previous app installation list by multiplying the second sample app embedding vector with the second one-hot feature; and
training the pre-trained user app interest embedding model using the first input vector and the second input vector as an input.

7. The electronic device according to claim 6, wherein training the pre-trained user app interest embedding model using the first input vector and the second input vector comprises:
inputting the input vectors into the pre-trained user app interest embedding model;
constructing a decoding network model corresponding to the pre-trained user app interest embedding model, and using an output of the pre-trained user app interest embedding model as an input of the decoding network model; and
performing back propagation, based on a decoding error of the sample current user app installation list by the decoding network model and a decoding error of the sample previous user app installation list by the decoding network model, and adjusting the app ID query vector table and the app category query vector table, so that the pre-trained user app interest embedding model converges.

8. The electronic device according to claim 6, wherein,
the acquiring a user existing app installation list and a user app installation list within a predetermined time window, further comprises:
periodically acquiring the user existing app installation list and the user app installation list within the predetermined time window according to a periodic time window, wherein the app comprises the app ID information and the app category information;
the inputting the user existing app installation list and the user app installation list within the predetermined time window into the pre-trained user app interest embedding model to obtain a user app interest embedding vector, further comprises:
inputting the periodically acquired user existing app installation list and the user app installation list within the predetermined time window into the pre-trained user app interest embedding model to obtain the user app interest embedding vector corresponding to the periodic time window; and storing the user app interest embedding vector corresponding to the periodic time window into a key-value library.

9. The electronic device according to claim 6, wherein collecting the set of sample user app installation lists comprising the sample current user app installation list and the sample previous user app installation list comprises:
   collecting a user app installation log, and associating app installation information in the app installation log with time;
   counting a number of users of the training app, and selecting a specific number of app sets by screening according to the number of users of the training app;
   determining the sample current user app installation list and the sample previous user app installation list according to the app sets; and
   acquiring the first app ID information, the first app category information, second app ID information and second app category information from the sample current user app installation list and the sample previous user app installation list.

10. A non-transitory computer readable storage medium storing computer instructions, wherein the computer instructions when executed by a computer, cause the computer to perform operations comprising:
   acquiring a user existing app installation list and a user app installation list within a predetermined time window, wherein an app comprises app ID information and app category information; and
   inputting the user existing app installation list and the user app installation list within the predetermined time window into a pre-trained user app interest embedding model to obtain a user app interest embedding vector, wherein the pre-trained user app interest embedding model is a neural network, and is trained by:
   collecting a set of sample user app installation lists comprising a sample current user app installation list, and a sample previous user app installation list within a sample predetermined time window before a sample current time point, wherein the sample current user app installation list comprises first app ID information and first app category information, and the sample previous user app installation list comprises second app ID information and second app category information;
   generating a first sample app embedding vector of the sample current user app installation list and generating a second sample app embedding vector of the sample previous user app installation list, by randomly setting an app ID query vector table and an app category query vector table and splicing the app ID query vector table and the app category query vector table; representing the sample current user app installation list as a first one-hot feature, representing the sample previous user app installation list as a second one-hot feature, determining a first input vector of the sample current app installation list by multiplying the first sample app embedding vector with the first one-hot feature, and determining a second input vector of the sample previous app installation list by multiplying the second sample app embedding vector with the second one-hot feature; and training the pre-trained user app interest embedding model using the first input vector and the second input vector as an input.

11. The storage medium according to claim 10, wherein training the pre-trained user app interest embedding model using the first input vector and the second input vector comprises:
   inputting the input vectors into the pre-trained user app interest embedding model;
   constructing a decoding network model corresponding to the pre-trained user app interest embedding model, and using an output of the pre-trained user app interest embedding model as an input of the decoding network model; and
   performing back propagation, based on a decoding error of the sample current user app installation list by the decoding network model and a decoding error of the sample previous user app installation list by the decoding network model, and adjusting the app ID query vector table and the app category query vector table, so that the pre-trained user app interest embedding model converges.

12. The storage medium according to claim 10, wherein, the acquiring a user existing app installation list and a user app installation list within a predetermined time window, further comprises:
   periodically acquiring the user existing app installation list and the user app installation list within the predetermined time window according to a periodic time window, wherein the app comprises the app ID information and the app category information;
   the inputting the user existing app installation list and the user app installation list within the predetermined time window into the pre-trained user app interest embedding model to obtain a user app interest embedding vector, further comprises:
   inputting the periodically acquired user existing app installation list and the user app installation list within the predetermined time window into the pre-trained user app interest embedding model to obtain the user app interest embedding vector corresponding to the periodic time window; and
   storing the user app interest embedding vector corresponding to the periodic time window into a key-value library.

13. The storage medium according to claim 10, wherein collecting the set of sample user app installation lists comprising the sample current user app installation list and the sample previous user app installation list comprises:
   collecting a user app installation log, and associating app installation information in the app installation log with time;
   counting a number of users of the training app, and selecting a specific number of app sets by screening according to the number of users of the training app;
   determining the sample current user app installation list and the sample previous user app installation list according to the app sets; and
   acquiring the first app ID information, the first app category information, second app ID information and second app category information from the sample current user app installation list and the sample previous user app installation list.

* * * * *